(12) United States Patent
Li et al.

(10) Patent No.: US 6,993,311 B2
(45) Date of Patent: Jan. 31, 2006

(54) RADIO RECEIVER HAVING AN ADAPTIVE EQUALIZER AND METHOD THEREFOR

(75) Inventors: Jungsong Li, Austin, TX (US);
Yui-Luen Ho, Austin, TX (US); Jie Su, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 497 days.

(21) Appl. No.: 10/079,352

(22) Filed: Feb. 20, 2002

(65) Prior Publication Data

US 2003/0157914 A1 Aug. 21, 2003

(51) Int. Cl.
*H04B 1/10* (2006.01)

(52) U.S. Cl. .................. 455/307; 455/283; 455/323; 375/232

(58) Field of Classification Search ................ 455/266, 455/283, 293, 307, 254, 324, 323; 375/232
See application file for complete search history.

(56) References Cited

U.S. PATENT DOCUMENTS

| 3,633,107 | A | * | 1/1972 | Brady | 375/267 |
| 4,852,090 | A | * | 7/1989 | Borth | 370/347 |
| 5,095,534 | A | * | 3/1992 | Hiyama | 455/266 |
| 5,524,125 | A | * | 6/1996 | Tsujimoto | 375/347 |
| 5,557,646 | A | * | 9/1996 | Honma | 375/346 |
| 5,564,093 | A | * | 10/1996 | Matsumoto | 455/266 |
| 5,572,552 | A | * | 11/1996 | Dent et al. | 375/343 |
| 5,859,870 | A | * | 1/1999 | Tsujimoto | 375/143 |
| 5,901,175 | A | * | 5/1999 | Limberg | 375/232 |
| 6,549,761 | B1 | * | 4/2003 | Kim | 455/127.1 |
| 2003/0078025 | A1 | * | 4/2003 | Smee et al. | 455/307 |
| 2003/0100286 | A1 | * | 5/2003 | Severson et al. | 455/324 |
| 2004/0203812 | A1 | * | 10/2004 | Malladi et al. | 455/450 |

OTHER PUBLICATIONS

Treichler et al., "A New Approach to Multipath Correction of Constant Modulus Signals," IEEE Transactions on Acoustics, Speech, and Signal Processing, vol. ASSP-31, No. 2, Apr. 1983, pp. 459-472.

* cited by examiner

*Primary Examiner*—Edward F. Urban
*Assistant Examiner*—Blane J. Jackson
(74) *Attorney, Agent, or Firm*—Daniel D. Hill; James L. Clingan, Jr.

(57) ABSTRACT

A radio receiver (100) has an equalizer (500) that operates in the time domain to remove residual interference that is not removed by an IF filter (200) operating in the frequency domain that is caused by an adjacent interfering FM station. The equalizer (500) includes a modified constant modulus algorithm (CMA) to generate a tap update signal from the output of the equalizer (500). The equalizer (500) uses the modified CMA to reduce an amplitude fluctuation of the received signal caused by the adjacent interfering station. The CMA is modified to use an infinite impulse response (IIR) filter (540) to generate the tap update. The IIR filter (540) also speeds up a convergence of the modified CMA to provide better performance.

22 Claims, 5 Drawing Sheets

US 6,993,311 B2

RADIO RECEIVER HAVING AN ADAPTIVE EQUALIZER AND METHOD THEREFOR

RELATED APPLICATION

This is related to U.S. patent application Ser. No. 09/818,337, filed Mar. 28, 2001 and entitled "Radio Receiver Having A Dynamic Bandwidth Filter And Method Therefor" and assigned to the current assignee hereof.

FIELD OF THE INVENTION

The present invention relates generally to receivers and more specifically to radio receivers having an equalizer and method therefor.

RELATED ART

In broadband FM (frequency modulation) broadcasting systems, one of the most important features of the system is that the bandwidth of the FM modulated signal (radio signal) changes with the envelope of the modulating signal (audio signal). However, in traditional FM receivers, the bandwidth of the intermediate frequency stage is fixed (about 100 KHz, single sided band). When the received FM signal strength is weak, it may become difficult to have good stereo separation due to excessive noise effect. Also, interference from the adjacent station (200 KHz away from the desired station in the United States and as little as 100 KHz in other parts of the world) will degrade the signal quality or even completely replace the desired station signal if the interfering signal is very strong, due to the capture effect of nonlinear demodulation process. A variable IFF (intermediate frequency filter) is used to reduce the bandwidth of the desired station. However, there is still a residual interfering signal from the adjacent station that is not removed by the variable IFF. Therefore, there is a need to remove the residual interfering signal to further improve the quality of the received signal.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Generally, the present invention provides an equalizer that operates in the time domain to remove residual interference caused by an adjacent FM station that is not removed by a variable IF filter operating in the frequency domain. The equalizer performs this function by using a modified constant modulus algorithm (CMA) to generate a tap update signal from the output of the equalizer. The CMA is modified to use an infinite impulse response (IIR) filter to generate the tap update. The equalizer uses the modified CMA to reduce an amplitude fluctuation of the received signal caused by the adjacent station. The IIR filter also speeds up a convergence of the modified CMA to provide better performance.

Figure 1:
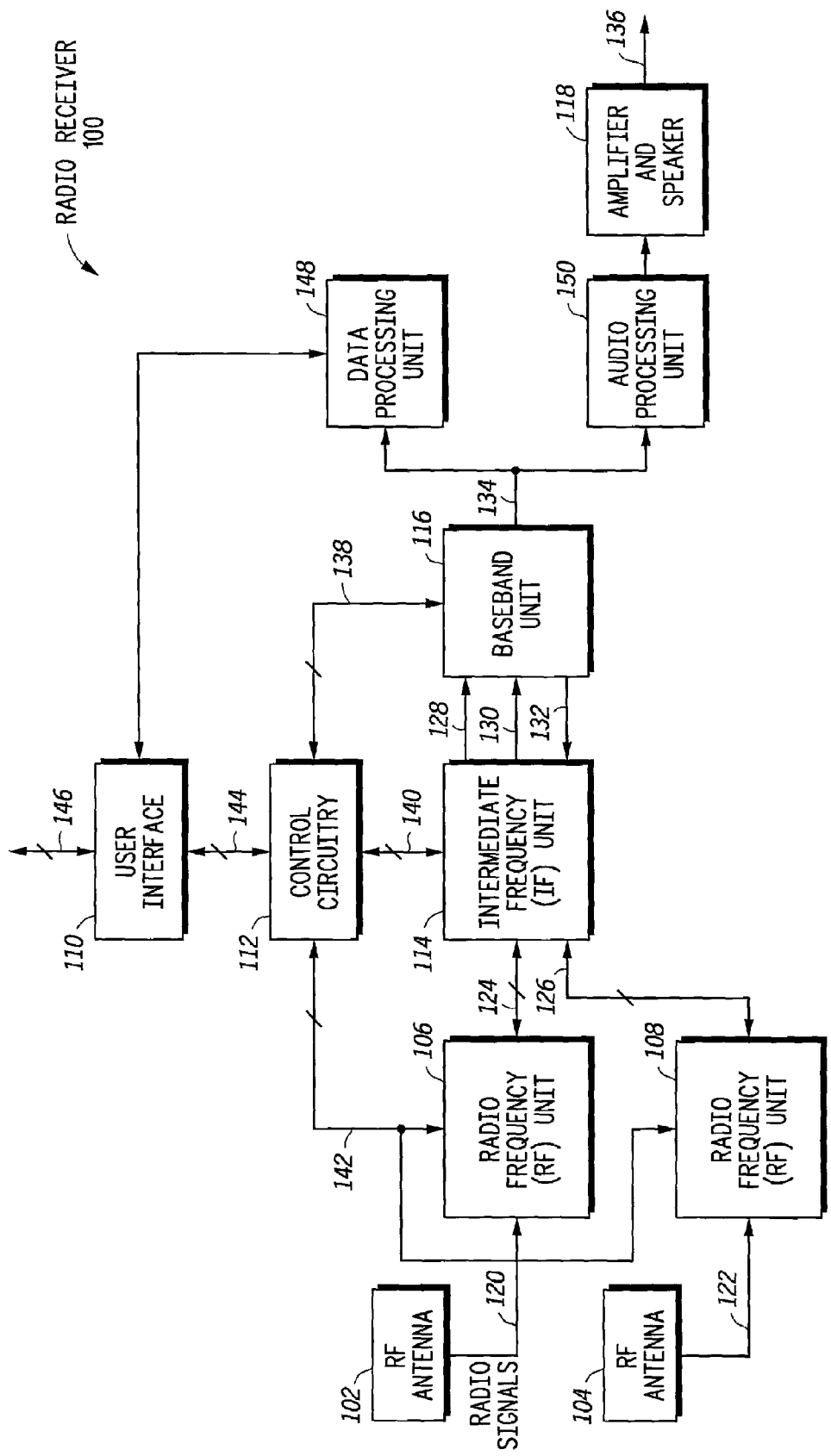
FIG. 1 illustrates, in block diagram form, a radio receiver in accordance with one embodiment of the present invention.

FIG. 1 illustrates a radio receiver 100 in accordance with one embodiment of the present invention. Radio receiver 100 includes user interface 110 bi-directionally coupled via conductors 144 to control circuitry 112. Control circuitry 112 is coupled to radio frequency (RF) units 106 and 108 via conductors 142, to intermediate frequency (IF) unit 114 via conductors 140, and baseband unit 116 via conductors 138. RF Unit 106 is coupled to RF antenna 102 via conductor 120 and is bi-directionally coupled to IF unit 114 via conductors 124. RF Unit 108 is coupled to RF antenna 104 via conductor 122 and is bi-directionally coupled to IF unit 114 via conductors 126. IF unit 114 is coupled to baseband unit 116 via conductors 128, 130 and 132. Baseband unit 116 is coupled to audio processing unit 150 and data processing unit 148 via conductor 134. Audio processing unit 150 is coupled to amplifier and speaker 118 which provides output signals via conductor 136. Data processing unit 148 is bidirectionally coupled to user interface 110. Also, users may provide and receive information to and from user interface 110 via conductors 146.

In operation, RF antennas 102 and 104 capture radio signals and provide them to RF Units 106 and 108, respectively. RF Units 106 and 108 translate the received radio signals to a common intermediate frequency range as dictated by the design of the radio receiver. That is, RF Units 106 and 108 may translate the frequency of the received radio signals to a lower frequency or to a higher frequency depending on the requirements of IF Unit 114 (and thus may be referred to as a "lower frequency unit" or a "higher frequency unit"). IF unit 114 receives the IF signals via conductors 124 and 126 and digitizes them through the use of an analog to digital converter. IF unit 114 also performs digital mixing to produce in-phase and quadrature digitized signals which are output via conductors 128 and 130 to base band unit 116. In alternate tuner embodiments, IF unit 114 is optional. That is, RF units 106 and 108 may translate the received radio signals from antennas 102 and 104 directly to base band and may include an analog to digital converter to provide the digitized base band signals directly to baseband unit 116.

Baseband unit 116 receives the digitized radio signals from intermediate frequency unit 114 or, if the IF unit does not exist in the specific embodiment, directly from RF units 106 and 108. Baseband unit 116 performs signal conditioning, demodulation, and decoding in order to produce audio and data information via conductor 134. The processing performed by baseband unit 116 will be further described in reference to later figures. Audio information via conductor 134 may be provided to audio processing unit 150 which may be coupled to amplifier and speaker 118 to produce an audio output from receiver 100 via conductor 136. For example, this may be music played from audio speakers. Alternatively, baseband unit 116 may output data information via conductor 134 to data processing unit 148 for further processing. The output of data processing unit 148 may be coupled to user interface 110 to allow user interaction with the output of receiver 100. For example, user interface 110 may represent a radio dial, a touch screen, monitor and keyboard, keypad, or any other suitable input/output device. The data information may represent text, graphics, or any other information transmitted in digital form.

Antennas 102 and 104 may therefore be referred to as sensors capable of sensing a variety of data formats. Furthermore, each of the sensors or antennas in the system may receive different formats of data so that, for example, one sensor may receive radio signals while other sensors may receive different types of data as listed above. Also, receiver 100 of FIG. 1 illustrates two sensors or antennas (e.g. antennas 102 and 104); however, alternate embodiments may use any number of sensors for capturing signals or information.

Figure 2:
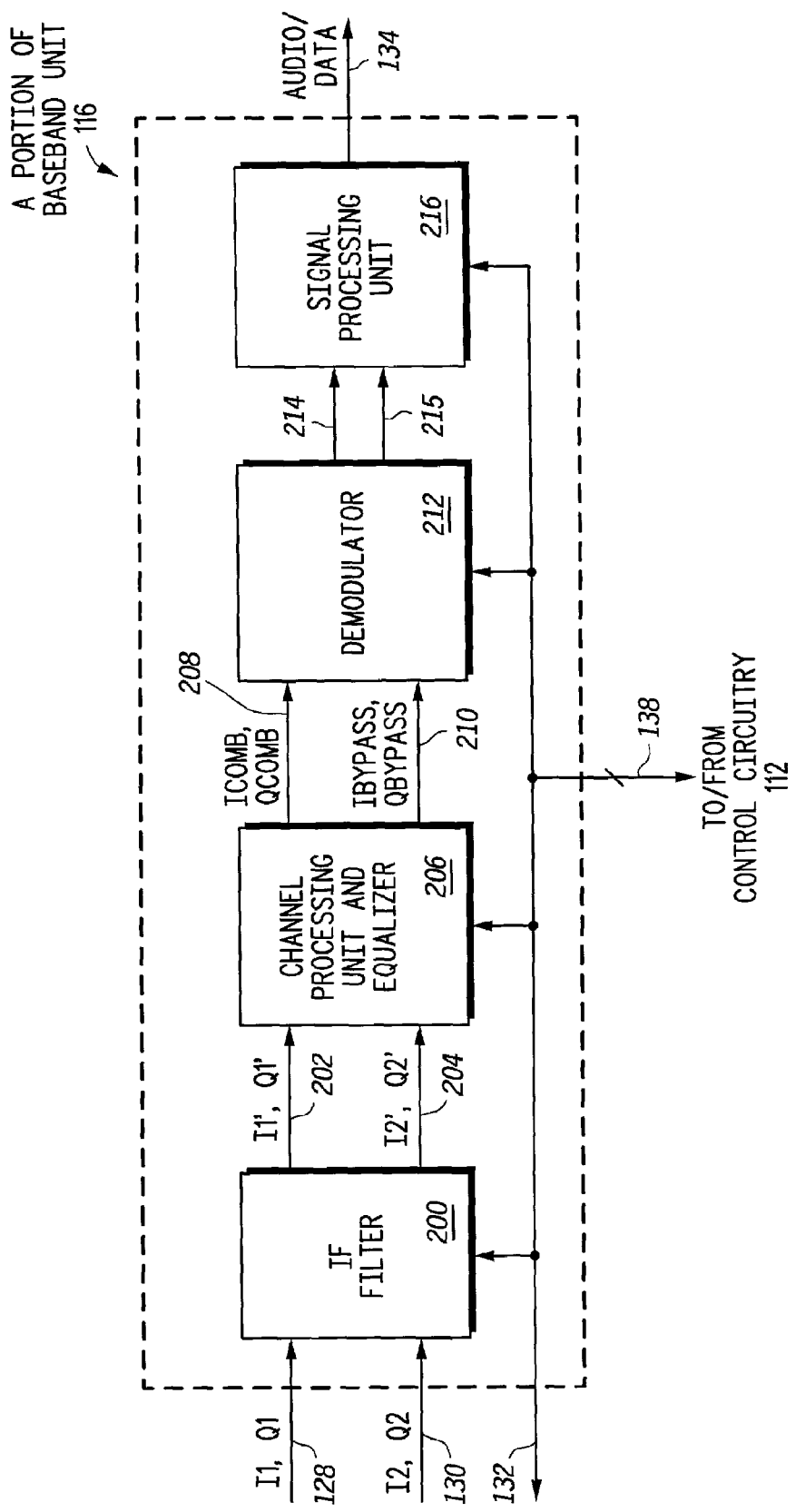
FIG. 2 illustrates, in block diagram form, a portion of a baseband unit of FIG. 1 in more detail.

FIG. 2 illustrates one embodiment of a portion of baseband unit 116. IF filter 200 receives in-phase and quadrature signal pairs I1, Q1 and I2, Q2 via conductors 128 and 130, respectively, where I1, Q1 corresponds to the signal received via sensor or antenna 102 and I2, Q2 corresponds to the signal received via sensor or antenna 104. I1 and I2 represent the digitized in-phase signals while Q1 and Q2 represent the digitized quadrature signals (e.g. signals that are 90 degrees out of phase as compared to the in-phase signals). (Note also that each signal such as I1, Q1 and I2, Q2 can be represented as a complex number where I1 and I2 represent the real portions and Q1 and Q2 represent the imaginary portions, as will be discussed further below.) IF filter 200 is coupled to channel processing unit 206 via conductors 202 and 204. Channel processing unit 206 is coupled to demodulator 212 via conductors 208 and 210, and demodulator 212 is coupled to signal processing unit 216 via conductors 214 and 215. Signal processing unit 216 provides audio/data information via conductor 134. IF filter 200, channel processing unit and equalizer 206, demodulator 212, and signal processing unit 216 are coupled to control circuitry 112 via conductors 138. Conductors 138 may be referred to as a control bus including a variety of conductors for transferring different signals to and from units 200, 206, 212 and 216. Conductor 132, for example, may include a subset of conductors 138 or may be the full bus 138 that is provided back to intermediate frequency unit 114. Therefore, control signals received via conductor 138 may be transmitted to IF frequency unit 114 via conductor 132. Likewise, these control signals or subsets of these signals may be transmitted back to the RF units 106 and 108 via conductors 124 and 126. Alternatively, control signals may be sent directly from control circuitry 112 to radio frequency units 106 and 108 via conductor 142.

In operation, IF filter 200 removes unwanted signals and noise from the desired frequency range of incoming signals I1, Q1, and I2, Q2. IF filter 200 also suppresses adjacent channels in order to produce filtered in-phase and quadrature signal pairs I1', Q1', and I2', Q2', where I1', Q1' corresponds to I1, Q1 and I2', Q2' corresponds to I2, Q2. Channel processing unit and equalizer 206 receives I1', Q1' and I2', Q2' and combines these to produce a single combination signal Icomb, Qcomb. Alternatively, if RF units 106 and 108 are tuned to different frequencies then channel processing unit and equalizer 206 may also provide one or both of its incoming signals such as I1', Q1' or I2', Q2' directly to demodulator 212 via conductors 208 and 210 as Ibypass, Qbypass. Therefore, channel processing unit and equalizer 206 provides the option of combining its incoming digitized signals or bypassing them directly to further processing units such as demodulator 212. Channel processing unit and equalizer 206 may also provide both a combined signal such as Icomb, Qcomb and bypass signals such as Ibypass, Qbypass. However, in the case where both channels are bypassed, signals Icomb, Qcomb are used as bypass signals as well. Channel processing unit and equalizer 206 and Ibypass, Qbypass also provide the ability to receive different types of signal formats such that one signal, such as I1', Q1', may be processed by channel processing unit and equalizer 206 and output via conductor 208 while a second signal, such as I2', Q2', may be a different signal format that is directly bypassed to demodulator 212. This allows channel processing unit and equalizer 206 to provide either a single combination signal or various different signals for further processing. For example, one antenna may provide signals from one radio station while a second antenna may provide signals from a second radio station or of a different data format all together.

Channel processing unit 206 also performs a noise reduction and equalization on the received signals. In accordance with the present invention, the equalization function is performed using an adaptive finite impulse response (FIR) filter based on a modification of the constant modulus algorithm (CMA) which will be discussed in more detail in the discussion of FIG. 5.

Also note that the embodiment illustrated in FIG. 2 illustrates only two signals received by IF filter 200 and channel processing unit 206. However, as was discussed in reference to FIG. 1, receiver 100 may include any number of antennas such as 102 and 104. In this embodiment, each antenna would provide its own in-phase and quadrature signal pair such as I1, Q1 to IF filter 200. Also, IF filter 200 may provide a plurality of filtered in-phase and quadrature signal pairs corresponding to each of the antennas. In this manner, channel processing unit 206 may output a single combination signal or multiple subcombinations of signals, as appropriate. In addition, channel processing unit 206 may provide multiple bypass signals so that more than one incoming signal may be directly bypassed to further processing units such as demodulator 212.

Demodulator 212 receives signals Icomb, Qcomb and Ibypass, Qbypass from channel processing unit 206 and provides demodulated signals to signal processing unit 216 via conductors 214 and 215. Also, if demodulator 212 receives signals Ibypass, Qbypass, demodulator 212 may provide a demodulated Ibypass, Qbypass, also via conductors 214 and 215 to signal processing unit 216. However, as discussed above, Ibypass, Qbypass is optional. For example, in one embodiment, demodulator 212 may be an FM demodulator providing multiplex (MPX) signals corresponding to each of its incoming signals (e.g. Icomb, Qcomb and Ibypass, Qbypass). In alternate embodiments, demodulator 212 may be an AM demodulator or a demodulator specific to any other signal format as required by the system (e.g. receiver 100) and incoming signals I1, Q1 and I2, Q2. Signal processing unit 216 may perform further processing on the signals received via conductors 214, 215 and outputs audio/data information via conductor 134. Audio/data information may include just audio information, just data information or a combination of both audio and data information. This data may then be output to various different systems such as data processing systems or audio processing systems, as illustrated in FIG. 1. For example, in an FM receiver, demodulator 212 outputs an MPX signal to signal processing unit 216 as discussed above. In this embodiment, signal processing unit 216 receives the MPX signal and performs stereo decoding in order to provide the proper signals to each speaker. For example, the MPX signal may be decoded utilizing a pilot tone to provide left and right speaker signals in a stereo system. Also, signal processing unit 216 may demodulate other sub-carrier signals (e.g. RDS or DARC) to provide further information to subsequent processing units.

Figure 3:
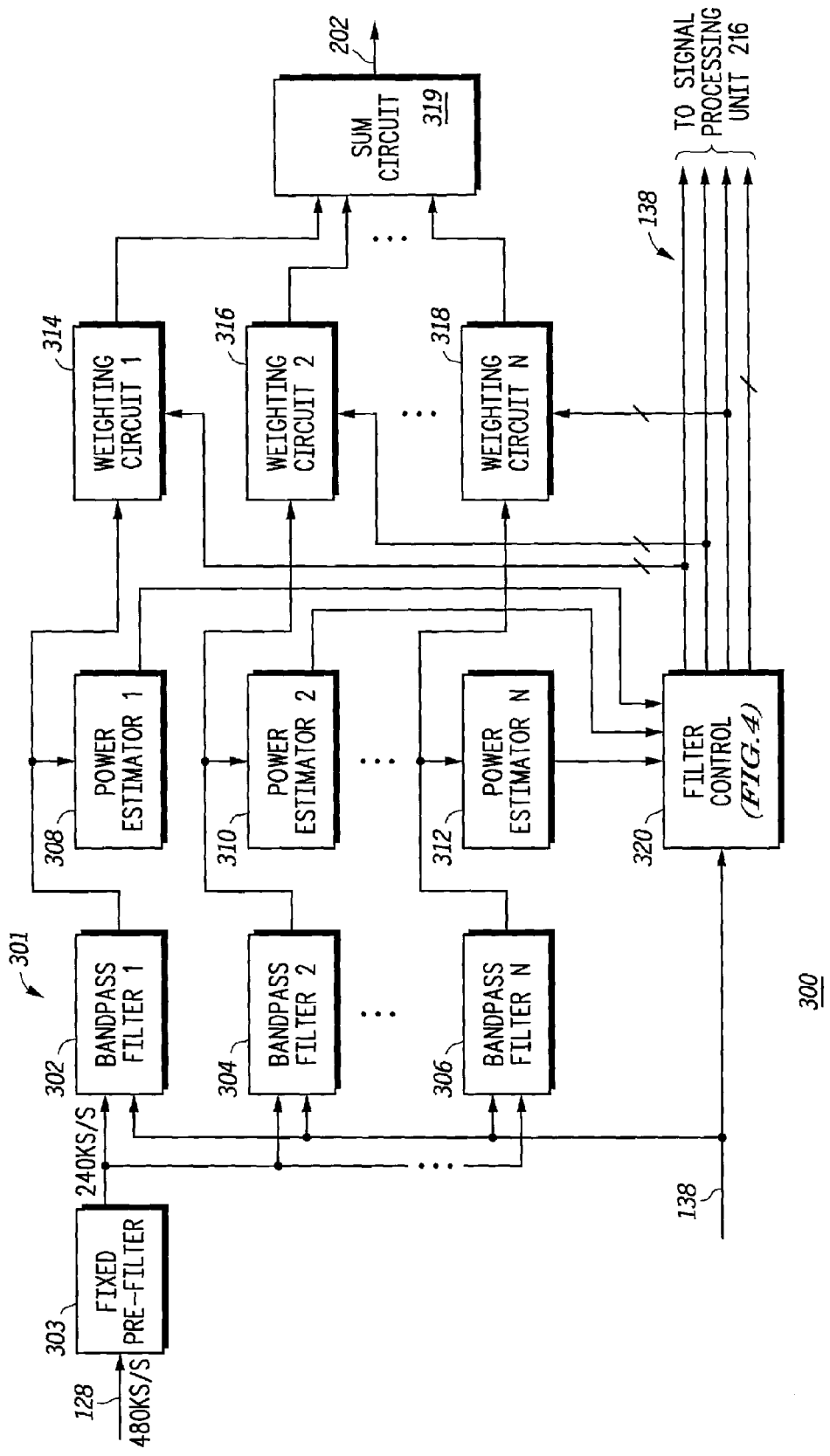
FIG. 3 illustrates, in block diagram form, a portion of the IF filter of FIG. 2 in more detail.

FIG. 3 illustrates, in block diagram form, a filter portion 300 of the IF filter 200 of FIG. 2. Filter portion 300 includes fixed pre-filter 303, filter bank 301, power/amplitude estimators 308, 310, 312, and 320, weighting circuits 314, 316, and 318, and summation circuit 319. In the illustrated embodiment, IF filter 200 includes an additional filter portion that is substantially identical to filter portion 300. The additional filter portion would be coupled between conductors 130 and 204 in FIG. 2.

Fixed pre-filter 303 has an input 128 for receiving incoming signals I1, Q1 at a data rate of 480 KS/s, and an output for providing filter signals at a data rate of 240 KS/s. Bandpass filters 302, 304, and 306 represent a plurality of bandpass filters, labeled as filter bank 301, and each has an input coupled to the output of fixed pre-filter 303. Bandpass filters 302, 304, and 306 also have an input coupled to conductors 138 for providing and receiving signals from control circuitry 112 (FIG. 1). The outputs of bandpass filters 302, 304, and 306 are coupled to inputs of weighting circuits 314, 316, and 318, respectively, and to inputs of power estimators 308, 310, and 320, respectively. Outputs of each of power estimators 308, 310, and 312 are coupled to filter control 320. Filter control 320 is illustrated in more detail in FIG. 4. Filter control 320 has an input coupled to conductors 138, and outputs coupled to conductors 138 for communicating with signal processing unit 216 (see FIG. 2). Weighting circuits 314, 316, and 318 also have inputs coupled to conductors 138, and outputs coupled to summation circuit 319. Summation circuit 319 has an output for providing signals I1', Q1' to channel processing unit 206 (FIG. 2).

In operation, fixed pre-filter 303 receives the digitized inphase and quadrature signals I1 and Q1 from IF unit 114. Fixed pre-filter 303 is implemented as a bandpass filter and provides additional stopband attenuation and allows a reduction of the sample rate from 480 KS/s (kilo samples per second) to 240 KS/s. The additional attenuation of the fixed pre-filter allows for a simpler filter bank and the reduction in sample rate reduces the computations needed to implement filter portion 300. Each of the bandpass filters of filter bank 301 receives the stopband attenuated intermediate frequency signal and generates a plurality of sub-band signals, each of the plurality of sub-band signals having a predetermined frequency range. In the illustrated embodiment, the Nyquist frequency bandwidth is partitioned into M sub-bands, where M is equal to 16. In other embodiments, M can be any number of sub-bands. Digital filter bank 301 is a filter composed of many sub-filters that are designed with particular characteristics so that the sub-bands are added together to form the whole signal. Bandwidth control of filter bank 301 is not affected by the choice of transfer function or filter. This eliminates a need to open up the bandwidth of the filter to check conditions, and thus risk allowing a degraded signal through the filter. Digital filter bank 301 decomposes the signal received on conductor 128 into multiple sub-band signals. Each sub-band filter 302, 304, and 306 has a linear-phase response. When some or all of the sub-band filters are weighted and summed together, a desired-passband and linear-phase bandpass filter is obtained. In the illustrated embodiment, the linear phase bandpass filter has a relatively flat passband.

Power estimators 308, 310, and 312 monitor the sub-band signals and estimate the power in each of the sub-bands. The power estimates are provided to filter control 320. Note that in the illustrated embodiment, power estimates are used. In other embodiments, other parameters may be monitored, such as for example, amplitude or energy of the sub-band signals. Filter control 320 receives the power estimates from the power estimators and provides one or more control signals that determine a percentage of each sub-band signal that is permitted to be coupled to summation circuit 319. In the illustrated embodiment, weighting circuits 314, 316, and 318 function to generate a weighting factor for determining how many of the bandpass filter outputs are allowed to be provided to summation circuit 319 and/or the percentage of each sub-band signals that is permitted to be coupled to summation circuit 319. That is, filter bank 301 receives a corrupted incoming signal and first decomposes the signal into multiple sub-band signals. Then, reception quality of the signal is continuously monitored by checking the power or amplitude of each sub-band signal regardless of use or weight. A set of weights is chosen to combine the sub-band signals together to generate a dynamically filtered output signal. Summation circuit 319 is implemented as an adder and sums the weighted sub-band signals to provide a filtered output signal. Demodulator 212 (FIG. 2) is coupled to the summing circuit for demodulating the filtered output signal to provide an audio output signal with optional data.

By implementing filter portion 300 as described above, it is possible to selectively reject sub-bands with adjacent channel energy and shrink the effective bandwidth of the filter in low frequency deviation or noisy conditions.

Note that FIG. 3 shows filter bank 301 implemented as a plurality of parallel-connected bandpass filters. However, filter bank 301 can also be implemented, for example, by using a technique described in "Multirate Systems and Filter Banks", by P. P. Vaidyanatha, page 165, published in 1993 by Prentice Hall. The bandpass filter of the illustrated embodiment must have characteristics such that the phase linearity and desired passband characteristics of a partial or whole sum are preserved.

Note that the weighting circuit output signals of filter control 320 are also provided to signal processing unit 216 to detect frequency overdeviation of the desired signal and frequency overdeviation of the adjacent channel.

Figure 4:
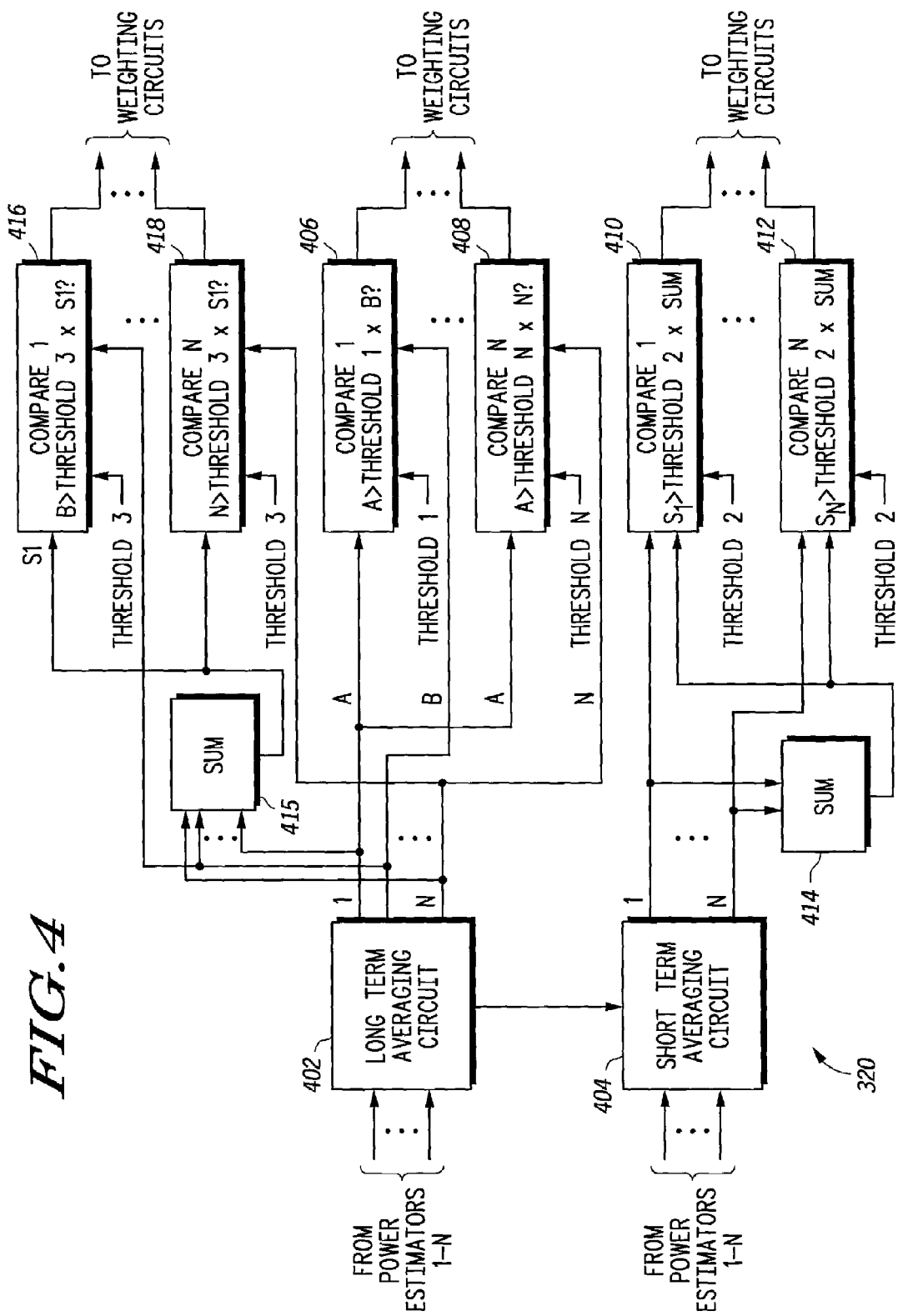
FIG. 4 illustrates, in block diagram form, the filter control block of FIG. 3 in more detail.

FIG. 4 illustrates, in block diagram form, filter control block 320 of FIG. 3 in more detail. Filter control block 320 includes long term averaging circuit 402, short term averaging circuit 404, summation circuits 414 and 415, and compare circuits 406, 408, 410, 412, 416, and 418.

Long term averaging circuit 402 has a plurality of inputs coupled to power estimators 308, 310, and 312, and a plurality of outputs coupled to summation circuit 415 and compare circuits 406, 408, 416, and 418. Also, long term averaging circuit 402 has an input coupled to short term averaging circuit 404. Short term averaging circuit 404 has a plurality of input coupled to power estimators 308, 310, and 312, and a plurality of outputs coupled to summation circuit 414 and compare circuits 410 and 412. Summation circuit 415 has an output coupled to each of compare circuits 416 and 418. Summation circuit 414 has an output coupled to each of compare circuits 410 and 412. Each of compare circuits 406, 408, 410, 412, 416, and 418 has an input for receiving a threshold value and an output coupled to weighting circuits 314, 316, and 318.

Filter portion 300 operates in three modes. In a first mode, filter portion 300 removes or attenuates adjacent channel energy encroaching on the desired channel. In this mode, long term averaging circuit 402 receives power estimates from power estimators 308, 310, 312, and 320 to perform a power averaging function in a predetermined timeframe to provide a plurality of averaged parameter signals and calculates the weights of each frequency sub-band. The lowest frequency sub-band is used as a reference signal for each of compare circuits 406, 408, 416, and 418. The power estimate for the lowest sub-band is long term averaged and used as a reference for determining each of the weight of the remaining sub-bands. The weight of each of the sub-bands is determined by comparing the reference to the long term average power estimate for the particular sub-band multiplied by a predetermined threshold value labeled "THRESHOLD 1" to "THRESHOLD N". As a result, if the output of long term averaging circuit is higher than the reference, then a signal is provided to the corresponding weighting circuit, attenuating the output of the weighting circuit that is to be summed by summing circuit 319. The level of attenuation can between zero percent and 100 percent of the sub-band output. In this manner, large adjacent channel interferers are detected and removed or at least attenuated. In addition, the desired sub-band levels may be amplified by using a weighting factor, or threshold value, greater than one. The desired signal is not attenuated as it generally has equal or lower power in the sub-band relative to the lowest sub-band.

In a second mode of operation, if none of the comparisons of compare circuits 406 to 408 are true, then filter 300 uses summing circuit 415 and comparison circuits 416 to 418 to prevent filter 300 from attenuating any of the received signal. Summing circuit 415 adds each of the outputs of the long term averaging circuit 402 to produce a summed signal labeled "S1". The Comparison circuits 416 to 418 compare S1 to each of the 2 through N outputs of the long term averaging circuit 402 multiplied by a predetermined threshold value. When the received signal power is large enough or the frequency deviation of the signal is wide enough, the output of each comparator is then provided to the weighting circuits that only attenuate sub-bands without significant signal power or simply add together all sub-band signals in order not to generate any distortion to the FM signal.

In the third mode of operation, filter 300 will shrink the effective bandwidth of the filter in low frequency deviation or noisy conditions. To shrink the effective bandwidth of the filter, short term averaging circuit 404 is used to provide a second plurality of averaged parameter signals. Short term averaging circuit 404 has a power averaging timeframe that is less than the averaging timeframe of long term averaging circuit 402. Short term averaging circuit 404 begins averaging when there is no adjacent channel interference and the output of summing circuit 415 is relatively small. The output signals from short term averaging circuit 404 are provided to a summing circuit 414 and to inputs of comparison circuits 410 and 412. Note that comparison circuits 416 and 418 compare whether the first of the plurality of averaged parameter signals from the long term averaging circuit 402 is greater than a product of a predetermined threshold value and a predetermined one of the plurality of averaged parameter signals. Comparison circuits 410 and 412 compare whether a predetermine one to the averaged parameter signals is greater than a product of a threshold value and the sum from summation circuit 414 to provide a control signals to the weighting circuits. Note that in the illustrated embodiment, for purposes of simplicity and clarity, only two of 16 compare circuits 410 and 412 are shown. The output of summing circuit 414 is used as a reference for each of the comparison circuits 410, 412 and is compared to the output signals from short term averaging circuit 404 multiplied by a predetermined threshold labeled THRESHOLD 2. The outputs of comparators 410 and 412 are provided to the weighting circuits of FIG. 3 to attenuate the sub-bands that have relatively little signal power. The faster time constant of short term averaging circuit 404 allows for more rapid bandwidth changes and trades signal distortion for less noise. Note that each of the threshold values 1 through N provided to the comparison circuits is different.

A user may selectively configure the power estimating circuits to control and vary a number of sub-bands which may be modified in response to predetermined values of the one or more control signals. The percentage of each sub-band signal that is permitted to be coupled to the output 134 varies dynamically in a predetermined range. A status circuit may be included with filter control 320 to provide an indication as to how many sub-band signals are permitted to be passed to the summing circuit and what reception quality exists.

Figure 5:
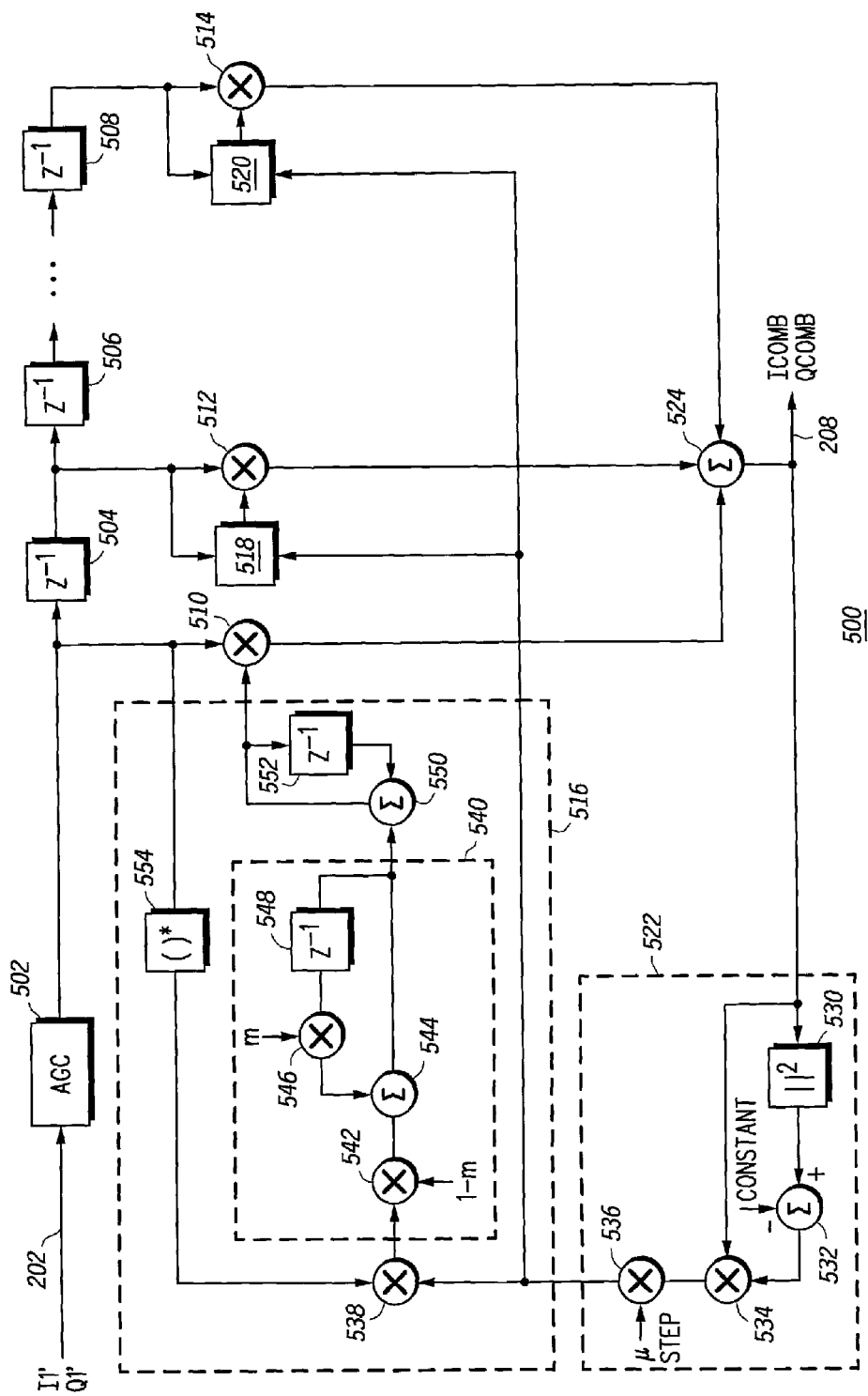
FIG. 5 illustrates, in block diagram form, a portion of the channel processing unit and equalizer block of FIG. 2 in more detail.

FIG. 5 illustrates, in block diagram form, an equalizer 500 of the channel processing unit and equalizer 206 in accordance with the present invention. Equalizer 500 includes automatic gain control (AGC) unit 502, delay elements 504, 506, and 508, multipliers 510, 512, and tap update circuits 514, 516, 518, and 520, error generator 522, IIR (infinite impulse response) filters 540. Tap update circuit 514 includes multiplier 538, complex conjugated circuit 554 IIR filter 540, summation circuit 550, and delay element 552. Summation circuit 550 and delay element 552 are connected to form an integrator circuit. IIR filter 540 includes multipliers 542 and 546, summation circuits 544, and delay element 548. Error generator 522 includes an absolute value generator circuit 530, summation circuit 532, and multipliers 534 and 536.

In an FM transmission, the amplitude of the transmitted signal is ideally relatively constant while the content of the signal is determined by the phase angle. An adjacent FM station (within about 200 KHZ from the desired station) having a relatively strong signal may cause unwanted amplitude variation of the desired station's signal. The constant modulus algorithm has been used to sense and remove this amplitude variation without affecting the phase angle. The constant modulus algorithm has been implemented to adapt a finite impulse response (FIR) digital filter to correct for the amplitude variation. However, the convergence time is relatively slow. The present invention improves the convergence time by modifying the constant modulus algorithm to include IIR filter 540 as described below in more detail. Referring to FIG. 5, filtered in-phase and quadrature signal pair I1', Q1' is received by AGC 502 of the equalizer portion 500 via conductor 202. AGC 502 performs a conventional automatic gain control function on signal pair I1', Q1' and provides a gain adjusted version of signal pair I1', Q1' to an input of delay element 504, multiplier 510, and tap update circuit 516. A series of delay elements 506 and 508 are coupled to received delayed versions of signal pair I1', Q1'. After each delay element a multiplier is used to multiply a filter tap coefficient generated by tap update circuits 516, 518, and 520 with the delayed gain adjusted version of signal pair I1', Q1'. An output of each of multipliers 510, 512, and 514, is provided to inputs of summation circuit 524. As a result, summation circuit 524 provides a combination signal Icomb, Qcomb having reduced interference via conductors 208 to demodulator 212 (illustrated in FIG. 2). Also, combination signal Icomb, Qcomb is provided to an input of error generator 522. Absolute value generator 530 receives the combination signal Icomb, Qcomb and provides signal $Icomb^2+Qcomb^2$. Summation circuit 532 then subtracts a constant from the output of absolute value generator 530. In the illustrated embodiment, the constant is a scaling factor of approximately 0.25. The amplitude of the output of AGC circuit 502 is set to 0.5 which is the scaling factor squared. In other embodiments, the constant may be a different value. The output of summation circuit 532 is provided to multiplier 534. Multiplier 534 multiplies the output of summation circuit 532 with combination signal Icomb, Qcomb. The output of multiplier 534 is multiplied with a step size $\mu$ signal by multiplier 536 to produce an error signal. The step size $\mu$ signal is used as a weighting factor.

The error signal from the output of error generator 522 is provided as an input to tap update circuit 516. Multiplier 538 multiplies the error signal with the complex conjugate of the delayed gain adjusted signal pair I1', Q1' to provide a result to an input of IIR filter 540. IIR filter 540 then provides an output to an integrator comprising summation circuit 550 and delay element 552. The integrator then provides a tap update to multiplier 510. The tap update is used to further suppress the residue interfering signal from the adjacent station to improve the performance of demodulator 212.

IIR filter 540 generally provides a low pass filtering function. The IIR filter 540 can be any conventional IIR filter. In the illustrated embodiment, IIR filter 540 is implemented as a first order IIR filter because it is relatively easy to implement and provides adequate performance. The input to multiplier 542 is an error signal generated by error generator 522. The error signal is multiplied by multiplier 542 to produce an error message. The error message is weighted up by the "1–m" where m is a constant determined through experimentation. The error message is provided as an input to summation circuit 544. The error message is the current error message. A previous error message is weighted up by "m" at multiplier 546 to produce a weighted up previous error message. The current error message is summed with the weighted up previous error message to produce an averaged-over-time error message. The averaged-over-time error message is provided to the integrator. An output of the integrator is then multiplied with the gain adjusted signal pair I1', Q1' by multiplier 510. Tap update circuits 518 and 520 are similar to tap update circuit 516 and function the same.

At start-up of the system having equalizer 500, a predetermined initial value is used for the tap update input of multiplier 510. The initial value is determined to have an amplitude of "1". The tap update inputs to multipliers 512 and 514 are all zeros. The phase of the initial value can be any number. An amplitude of "1" is determined by experimentation to provide faster convergence and better overall performance in the illustrated embodiment. In other embodiments, different initial values may be used.

Overall, IF filter 200 first decomposes the received signal (desired FM plus interference FM from the adjacent station) into a bank of subband signals with different center frequencies. Once IF filter 200 detects the existence of the energy from the unwanted interfering signal, it will turn off some of the subbands to remove a majority part of the interference signal energy. After this, equalizer 500, based on the modified CMA is applied to the resultant signal. Because the modified CMA of equalizer 500 tries to lock to signals with a larger modulus and reject weaker signals, it can further suppress the residue interfering signal to improve the performance of FM demodulator 212.

Therefore, the present invention provides an adaptive FIR filter in the form of an equalizer that is useful for removing residual interference from adjacent FM stations that are as close as 100 KHz away from the desired FM station.

The invention can be used in any of a number of products that receive a constant modulus signal, such as for example, an FM receiver, a GSM cellphone receiver, a television receiver, a personal digital assistant product, a computer, a wireless communication device, a satellite receiver or an OFDM (orthogonal frequency division multiplexer) receiver.

In the foregoing specification, the invention has been described with reference to specific embodiments. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A radio receiver, comprising:
   a radio frequency unit for receiving a plurality of radio signals and providing a selected radio signal;
   an intermediate frequency unit, coupled to the radio frequency unit, for providing a digitized signal;
   a filter for filtering a portion of the digitzed signal and providing a filtered digitized signal;
   an equalizer comprising a tap update circuit having an infinite impulse response (IIR) filter and an error generator for providing error messages to the IIR filter, where a previous error message of the error messages is weighted up by a value (m) and a current error message of the error messages is weighted up by a value 1–m, the current error messages being summed with the previous error message to produce an averaged-over-time error message for updating tap values of the tap update circuit, the equalizer for selectively filtering portions of the filtered digitized signal and providing a interference-reduced digitized signal; and
   a demodulator/processor for demodulating the interference-reduced digitized signal and providing an audio signal derived from the interference reduced digitized signal.

2. The radio receiver of claim 1, wherein the equalizer comprises:
   an automatic gain control (AGC) circuit having an input for receiving the filtered digitized signal and an output;

a first multiplier having a first input coupled to the output of the AGC circuit, a second input, and an output;

the error generator having an input coupled to the output of the first multiplier and an output; and the IIR filter having an input coupled to the output of the error generator and an output coupled to the second input of the first multiplier.

3. The radio receiver of claim 2, wherein the equalizer further comprises:

a first delay having an input coupled to the output of the AGC circuit and an output;

a second multiplier having a first input coupled to the output of the first delay, a second input; and an output;

an adder, coupled between the first multiplier and the error generator, having a first input coupled to the output of the first multiplier, a second input coupled to the output of the second multiplier, and an output coupled to the error generator; and a second IIR filter having an input coupled to the output of the error generator and an output coupled to the second input of the second multiplier.

4. The radio receiver of claim 3, wherein the adder has a third input, further comprising:

a second delay having an input coupled to the output of the first delay;

a third multiplier having a first input coupled to the output of the second delay, a second input; and an output coupled to the third input of the adder, and a third IIR filter having an input coupled to the output of the error generator and an output coupled to the second input of the third multiplier.

5. The radio receiver of claim 2, wherein the equalizer further comprises:

a complex conjugate circuit having an input coupled to the output of the AGC circuit, and an output;

a second multiplier having a first input coupled to the output of the complex conjugate circuit, a second input coupled to the output of the error generator, and an output coupled to the input of the IIR filter; and an integrator having an input coupled to the output of the IIR filter and output coupled to the second input of the first multiplier.

6. The radio receiver of claim 5, wherein the IIR filter comprises:

a third multiplier having a first input for receiving the value 1−m, a second input coupled to the output of the second multiplier, and an output;

an adder having a first input coupled to the output of the third multiplier, a second input, and an output coupled to the input of the integrator;

a delay circuit having an input coupled to the output of the adder and an output; and a fourth multiplier having an first input coupled to the output of the delay circuit, a second input coupled to receive the value in, and an output coupled to the second input of the adder.

7. In a radio receiver that generates digitized signal, a method for providing an interference-reduced digitized signal comprising:

performing filtering of the digitized signal to produce a filtered digitized signal;

generating a plurality of error messages;

using an IIR filter for updating tap values of an equalizer in response to the plurality of error messages and the filtered digitized signal, wherein a previous error message of the plurality of error messages is weighted up by a value (m) and a current error message or the plurality of error messages is weighted up by a value 1−m, the current error message being summed with the previous error message to produce an averaged-over-time error message for updating tap values of the tap undate circuit; and performing filtering of the filtered digitized signal to produce the interference-reduced signal.

8. The method of claim 7, wherein using an IIR filter further comprises using a first order IIR filter.

9. The method of claim 7, further comprising:

providing automatic gain control on the filtered digitized signal to produce a gain-adjusted digitized signal;

performing complex conjugation on the gain-adjusted signal to provide a compex signal; and multiplying the complex signal with the error signal to provide an error message of the plurality of error messages to the IIR filter.

10. In a radio receiver that generates an digitized signal, a circuit for providing an interference-reduced digitized signal comprising:

a filter having an input coupled for receiving the digitized signal, and an output; and an equalizer having an input coupled to the output of the filter, and an output for providing the interference-reduced digitized signal, the equalizer comprising a plurality of taps and a plurality of tap update circuits, a tap update circuit of the plurality of tap update circuits corresponding to one of the plurality of taps, each of the plurality of tap update circuits comprising an infinite impulse response (IIR) filter, and the equalizer comprising an error generator coupled to the plurality of tap update circuits, the error generator for providing error messages to the IIR filter, where a previous error message of the error messages is weighted up by a value (m) and a current error message of the error messages is weighted up by a value 1−m the current error message being summed with the previous error message to produce an averaged-over-time error message for updating tap values of the plurality of tap update circuits.

11. The radio receiver of claim 10, wherein the equalizer comprises:

a first tap circuit having a first input coupled to the input of the equalizer, a second input, and an output coupled to the output of the equalizer;

the error generator having an input coupled to the output of the tap circuit, and an output; and a first tap update circuit having an input coupled to the output of the error generator, and an output coupled to the second input of the first tap circuit.

12. The radio receiver of claim 11, wherein the first tap update circuit comprises:

a multiplier having a first input coupled to the output of the error generator, a second input coupled to the input of the equalizer, and an output;

a second IIR filter circuit having an input coupled to the output of the multiplier and an output coupled to the second output of the first tap circuit.

13. The radio receiver of claim 11, further comprising:

a second tap circuit having a first input coupled to the input of the equalizer, a second input, and an output coupled to the output of the equalizer, and a second tap update circuit having an input coupled to the output of the error generator, and an output coupled to the second input of the second tap circuit.

14. The radio receiver of claim 13, further comprising an adder having a first input coupled to the output of the first tap circuit, a second input coupled to the output of the second tap circuit, and an output coupled to the input of the error generator circuit.

15. In a radio receiver that generates a digitized signal, an equalizer having an input for receiving the digitized signal and an output for providing an interference-reduced digitized signal comprising:
   a first tap circuit having a first input coupled to the input of the equalizer, a second input, and an output coupled to the output of the equalizer;
   an error generator having an input coupled to the output of the tap circuit, and an output;
   a first multiplier having a first input coupled to output of error generator, a second input coupled to the input of the equalizer, and an output; and
   a first infinite impulse response (IIR) filter circuit having an input coupled to the output of the first multiplier and an output coupled to the second input of the first tap circuit;
   wherein the error generator provides error messages to the first IIR filter circuit, and wherein a previous error message of the error messages is weighted up by a value (m) and a current error message of the error messages is weighted up by a value 1−m, the current error message being summed with the previous error message to produce an averaged-over-time error message for updating tap values of the tap update circuit.

16. The radio receiver of claim 15, further comprising:
   a second tap circuit having a first input coupled to the input of the equalizer, a second input, and an output;
   an adder having a first input coupled to the output of the first tap circuit, a second input coupled to the second tap circuit, and an output coupled to the error generator;
   a second multiplier having a first input coupled to the output of the error generator, a second input coupled to the input of the equalizer, and an output; and
   a second IIR filter circuit having an input coupled to the output of the second multiplier and an output coupled to the second input of the second tap circuit.

17. The radio receiver of claim 16, further comprising a first delay circuit having an input coupled to the input of the equalizer circuit and an output coupled to the input of the second tap circuit.

18. The radio receiver of claim 17, further comprising:
   a first integrator having an input coupled to the output of the first IIR filter circuit and an output coupled to the second input of the first tap circuit; and
   a second integrator having an input coupled to the output of the second IIR filter circuit and an output coupled to the second input of the second tap circuit.

19. The radio receiver of claim 18, wherein the first IIR filter circuit comprises:
   a third multiplier having a first input for receiving the value 1−m, a second input coupled to the output of the first multiplier, and an output;
   a second adder having a first input coupled to the output of the third multiplier, a second input, and an output coupled to the input of the fast integrator;
   a delay circuit having an input coupled to the output of the second adder and an output; and
   a fourth multiplier having an first input coupled to the output of the delay circuit, a second input coupled to a signal representing the value m, and an output coupled to the second input of the second adder.

20. In a radio receiver that generates a digitized signal, an equalizer having an input receiving the digitized signal and an output for providing an interference-reduced digitized signal comprising:
   a plurality of tap circuits each having a first input coupled to the input of the equalizer, a second input, and an output coupled to the output of the equalizer;
   an error generator having an input coupled to the outputs of the plurality of tap circuits, and an output;
   a plurality of multipliers each having a first input coupled to output of the error generator, a second input coupled to the input of the equalizer, and an output; and
   a plurality of infinite impulse filter (IIR) circuits, each corresponding to a multiplier of the plurality of multipliers and to a tap circuit of the plurality of tap circuits and having an input coupled to the output of the multiplier to which it corresponds and an output coupled to the second input of the tap circuit to which it corresponds;
   wherein the error generator provides error messages to the plurality of IIR filter circuits, and wherein a previous error message of the error messages is weighted up by a value (m) and a current error message of the error messages is weighted up by a value 1−m, the current error message being summed with the previous error message to produce an averaged-over-time error message for updating tap values of the plurality of tap circuits.

21. In a radio receiver that generates a digitized signal, a method for providing an interference-reduced digitized signal comprising:
   filtering the digitized signal using an equalizer having a plurality of taps;
   generating a plurality of error messages responsive to the interference-reduced digitized signal, wherein a previous error message of the plurality of error messages is weighted up by a value (m) and a current error message of the plurality of error messages is weighted up by a value 1−m, the current error message being summed with the previous error message to produce an averaged-over-time error message; and
   updating a plurality of tap values of the equalizer in response to the averaged-over-time error message and the IF signal.

22. The method of claim 21, wherein the step of filtering comprises:
   providing automatic gain control on the digitized signal to produce a gain-adjusted digitized signal;
   generating delayed signals from the gain-adjusted signal;
   multiplying the gain-adjusted digitized signal and the delayed signals with the plurality of tap values to produce multiplied signals; and
   adding the multiplied signals to produce the interference-reduced signal.

* * * * *

UNITED STATES PATENT AND TRADEMARK OFFICE
CERTIFICATE OF CORRECTION

PATENT NO. : 6,993,311 B2
APPLICATION NO. : 10/079352
DATED : January 31, 2006
INVENTOR(S) : Junsong Li It is certified that error appears in the above-identified patent and that said Letters Patent is hereby corrected as shown below:

In Column 10, Line 54, Claim No. 1:
 Change "the current error messages being summed" to --the current error message being summed--

In Column 11, Line 13, Claim No. 3:
 Change "of the first delay, a second input;" to --of the first delay, a second input,--

In Column 11, Line 53, Claim No. 6:
 Change "a fourth multiplier having an first input" to --a fourth multiplier having a first input--

In Column 11, Line 55, Claim No. 6:
 Change "receive the value in, and a output coupled" to --receive the value m, and an output coupled--

In Column 11, Line 57, Claim No. 7:
 Change "In a radio receiver that generates digitized signal," to --In a radio receiver that generates a digitized signal,--

In Column 11, Line 67, Claim No. 7:
 Change "and a current error message or the" to --and a current error message of the--

In Column 12, Line 18, Claim No. 10:
 Change "In a radio receiver that generates an digitized signal," to --In a radio receiver that generates a digitized signal,--

In Column 12, Line 36, Claim No. 10:
 Change "is weighted up by a value 1-m the current" to --is weighted up by a value 1-m, the current--

UNITED STATES PATENT AND TRADEMARK OFFICE
CERTIFICATE OF CORRECTION

PATENT NO. : 6,993,311 B2
APPLICATION NO. : 10/079352
DATED : January 31, 2006
INVENTOR(S) : Junsong Li It is certified that error appears in the above-identified patent and that said Letters Patent is hereby corrected as shown below:

In column 14, Line 1, Claim No. 19:
Change "a fourth multiplier having an first input coupled" to --a fourth multiplier having a first input coupled--

Signed and Sealed this

Twenty-fourth Day of June, 2008

JON W. DUDAS
*Director of the United States Patent and Trademark Office*